June 16, 1931.  C. WILHJELM  1,810,331
OIL VALVE
Filed Jan. 19, 1929
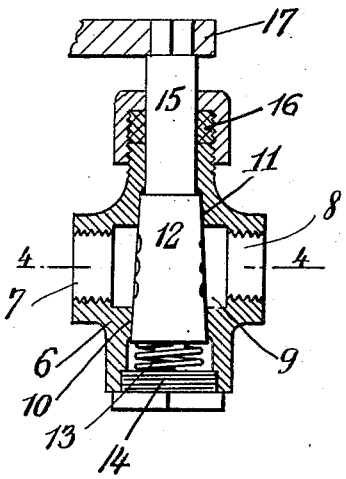
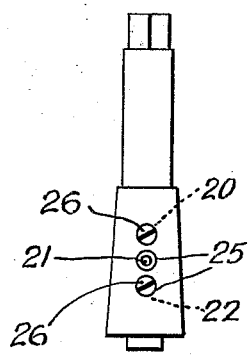
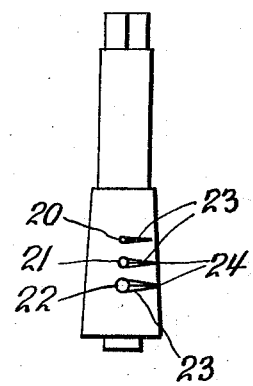
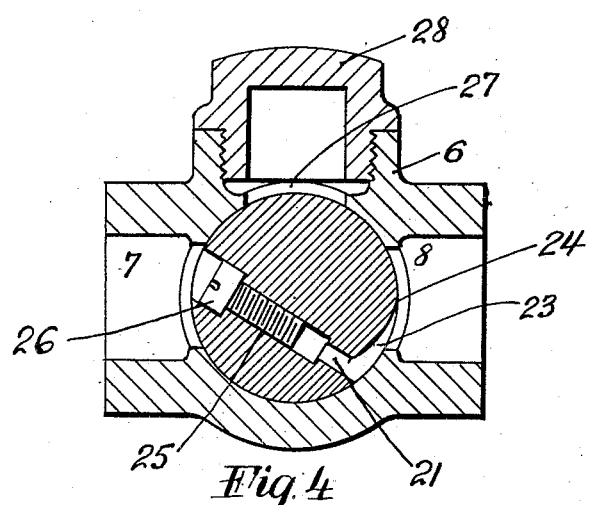
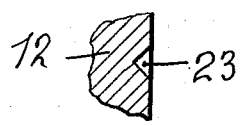
Christian Wilhjelm
INVENTOR
BY
ATTORNEY Patented June 16, 1931

1,810,331

UNITED STATES PATENT OFFICE

CHRISTIAN WILHJELM, OF PHILADELPHIA, PENNSYLVANIA, ASSIGNOR, BY MESNE ASSIGNMENTS, TO CHRISTIAN WILHJELM, OF PHILADELPHIA, PENNSYLVANIA, AS TRUSTEE

OIL VALVE

Application filed January 19, 1929. Serial No. 333,732.

This invention relates to fuel oil valves of the type used in connection with steam or air for supplying fuel to furnaces and where close control of the atmosphere and temperature of a furnace is essential.

The object of the invention is to provide an improved valve for this purpose embodying novel features of construction and control.

To this end the invention is embodied in a valve arranged and constructed as hereinafter set forth and as illustrated in the accompanying drawings in which Figure 1 is a vertical sectional view of the valve.

Figure 2 is a view of the valve plug showing the inlet side.

Figure 3 is a view of the valve plug showing the outlet side.

Figure 4 is a horizontal sectional view on line 4—4 of Figure 1.

Figure 5 is a detail view.

The reference numeral 6 denotes a valve casing having an inlet 7 and an outlet 8. The casing forms a valve chamber 9 having tapered seats 10 and 11. 12 is a tapered valve plug which is seated against the valve seats by means of a spring 13. A plug 14 closes the bottom of the valve. The valve plug has a stem 15 which extends upwardly through a stuffing box 16 and to which an operating arm 17 may be attached.

The valve plug is bored so that fuel oil, for instance, may pass from the inlet to the outlet. The specific improvements according to this invention reside in the construction of the valve plug whereby fine adjustment may be obtained to control the passage of the fuel oil through the valve.

As shown in Figure 3, the valve plug is provided with three outlet orifices 20, 21 and 22. These are graded from a minimum size to a maximum size as shown. Each outlet orifice communicates with a V-shaped tapered channel 23, Figure 5, which ends in a point 24 on the surface of the plug and which extends for a short distance along the plug surface.

Each outlet orifice is an extension of and leads into an inlet bore 25 adapted to be closed with a screw 26. The inlets 25 are all of the same size, so that any of the three orifices or a combination of two may be used by merely shifting the screws 26. Thus in Figure 2 it will be seen that outlet orifice 21 is open, while orifices 20 and 22 are closed.

The valve chamber has an opening 27 to the one side, which opening is closed by a plug 28. By removing the latter access is had to the interior of the valve and the screws 26 may then be shifted or entirely removed.

It will readily be seen that a valve as herein disclosed provides for adjustment to a very fine degree as may be required. Not only does each outlet orifice provide a different volume of flow of the liquid fuel, but each orifice may be adjusted individually by a mere rotation of the valve plug, whereby the outlet opening may be adjusted to almost nothing at the point 24.

In practice it has been found necessary to provide adjustment to a very fine degree and the valve herein solves the problem in a very simple and efficient manner.

I claim:

1. A valve mechanism comprising a valve chamber having an inlet and an outlet, a valve plug in said chamber provided with a plurality of passages leading from said inlet to the said outlet, each of said passages comprising an orifice leading from an eccentric tapered groove in the surface of said plug in its outlet side a distance into said plug and a threaded bore leading from the orifice to the inlet side of the plug, screws for closing said threaded bores, all of said orifices and grooves being graded in size and all of said bores being of the same size and means permitting access to the said plug from outside the valve.

2. A valve mechanism comprising a valve chamber having an inlet and an outlet, a valve plug in said chamber provided with a plurality of passages leading from said inlet to the said outlet, each of said passages being located at a different level from the other passages and comprising an orifice leading from an eccentric tapered groove in the surface of said plug in its outlet side a distance into said plug and a threaded bore leading from the orifice to the inlet side of the plug, screws for closing said threaded bores, all of said orifices and grooves being graded in size and all of said bores being of the same size and means permitting access to the said plug from outside the valve.

CHRISTIAN WILHJELM.